A. H. BROWN.
Churn.
No. 69,623.
Patented Oct. 8, 1867.
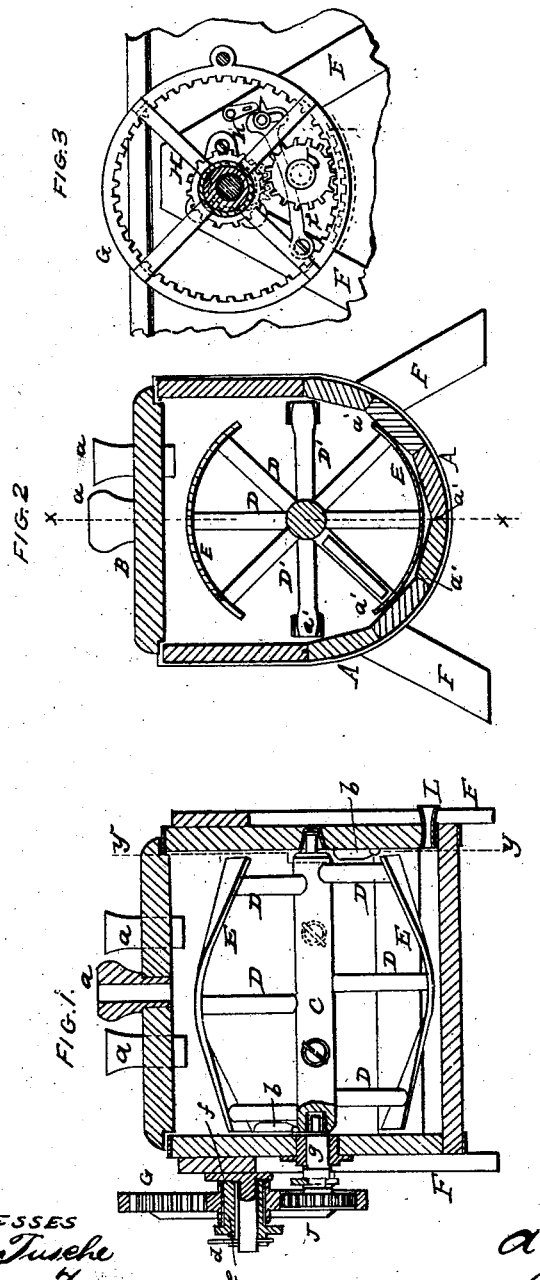

United States Patent Office.

A. H. BROWN, OF SPRINGFIELD, VERMONT.

*Letters Patent No. 69,623, dated October 8, 1867.*

---

IMPROVEMENT IN CHURNS.

---

The Schedule referred to in these Letters Patent and making part of the same.

---

TO ALL WHOM IT MAY CONCERN:

Be it known that I, A. H. BROWN, of Springfield, in the county of Windsor, and State of Vermont, have invented a new and useful Improvement in Churns; and I do hereby declare that the following is a full, clear, and exact description thereof, which will enable others skilled in the art to make and use the same, reference being had to the accompanying drawings, forming a part of this specification.

This invention relates to a new and improved method of constructing churns, and the invention consists in the peculiar formation of the dasher and bottom portion of the churn-vessel, and also in the method in which the motion given by the gearing is changed from fast to slow, and *vice versa*, as will be hereinafter described.

Figure 1 represents a vertical section of the churn through the line $x\ x$ of fig. 2.

Figure 2 is a cross-section of the churn through the line $y\ y$ of fig. 1.

Figure 3 is a detached view of the gearing, showing the manner of its arrangement and operation.

Similar letters of reference indicate corresponding parts.

The box or body of the churn is marked A. The lower half of it forms a cylinder composed of segments with flat surfaces within the churn, forming obtuse angles $a'$ with each other, as seen in the drawing. The upper half or portion of the box is formed of vertical parallel sides. B represents the top or cover of the churn, which has air-tubes through it, marked $a$. C represents the shaft of the churn. D D′ represent the arms in the shaft, to which the dashers are attached. E represents the main dashers, which may be described as oblique longitudinal sections of a cylinder, and which, in their revolution, fit the cylindrical portion of the box A, as seen in the drawing. On the shorter arms D′ there are dashers placed at an angle on the arms so as to throw the cream towards the centre or middle of the churn. The main dashers E are placed parallel with each other on the arms, so that their action on the cream has the same effect. Attached to one of the arms at each end of the churn (by small studs) there is a scraper, $b$, seen in fig. 1, which, as the dasher revolves, runs very near the ends or heads of the churn, thus preventing the cream from adhering to the end of the churn. F represents the frame or legs which support the churn. The segments and sides of the churn are secured to the heads by metallic bands or hoops, which pass entirely around each end of the churn, thus preventing all danger of bursting open or cracking. The dashers are revolved by gearing, as seen in the drawing. G is an internal gear and driving or crank-wheel. H is a pinion-wheel, which is attached to the centre of the driving-wheel G. J is a pinion-wheel, which is connected with the dasher-shaft. This pinion J is made to engage either with the main wheel G or with the pinion H, so as to suit the motion which it is desired to give the dashers in the process of churning. This change of motion is effected by using an eccentric thimble, marked $e$, on the pivot $f$. The pivot $f$ is attached to the frame of the churn, and the thimble $e$ is slipped on to it. The main wheel revolves around this thimble. The hole through the thimble is not through the centre, but on one side of the centre, as seen in the drawing. When it is placed on the pivot $f$, as seen in figs. 1 and 3, the main wheel is drawn up so that its cogs mesh with the pinion J. Now, if the thimble is turned around on the pivot a half of a revolution, the main wheel will be thrown out of gear with J, and the small wheel H will be thrown into gear with J. The large or main wheel gives the dashers a rapid motion, which is used until the butter "comes," when the main wheel is thrown out of gear by reversing the thimble, as before stated, when a slow or moderate motion is given by the two small wheels for gathering the butter. The thimble $e$ has a slot in its head or outer end, and there is a hole through the pivot, so that the thimble is held in place by a pin, $d$, as seen in fig. 1. The pinion J is connected with the dasher-shaft by an arbor, marked $g$, which runs in a box in the frame, marked $h$. The inner end of the arbor $g$ is square, and enters a square socket in the end of the dasher-shaft C, as seen in the drawing. This arrangement is for the purpose of allowing the dasher-shaft to be removed from the churn. To do this the arbor $g$ is withdrawn, when the shaft and dashers are removed from the drum without difficulty. The arbor $g$ is held in place, when the churn is in operation, by the latch $i$, which drops into a groove in the arbor, and which is held in that position by the button $k$, as seen in figs. 1 and 3. L is a discharge tube.

Having thus described my invention, what I claim as new, and desire to secure by Letters Patent, is—

1. The angles in the cylindrical portion of the churn, marked $a'$, substantially as described.

2. The dasher E, forming an oblique longitudinal section of a cylinder, attached to the arms as shown, and operating substantially as and for the purposes described.

3. In combination with the dashers E, I claim the scrapers $b$, attached to the arm D, substantially as shown and described; also the latch $i$ and button $k$, as and for the purpose set forth.

A. H. BROWN.

Witnesses:
D. M. SMITH,
F. J. KNIGHT.